United States Patent [19]

Pavlath

[11] Patent Number: 4,729,620
[45] Date of Patent: Mar. 8, 1988

[54] FIBER OPTIC FREQUENCY SHIFTER

[75] Inventor: George A. Pavlath, Thousand Oaks, Calif.

[73] Assignee: Litton Systems, Inc., Beverly Hills, Calif.

[21] Appl. No.: 613,827

[22] Filed: May 25, 1984

[51] Int. Cl.$^4$ .................................................. G02B 6/26
[52] U.S. Cl. ................................. 350/96.15; 350/96.30
[58] Field of Search ............... 350/96.15, 96.14, 96.29, 350/96.30, 353, 371; 332/7.51; 324/72, 96, 244; 356/350, 351

[56] References Cited

U.S. PATENT DOCUMENTS

| 4,153,328 | 5/1979 | Wang | 350/96.15 |
|---|---|---|---|
| 4,265,541 | 5/1981 | Leclerc et al. | 350/96.14 |
| 4,298,245 | 11/1981 | Aulich et al. | 350/96.30 |
| 4,378,951 | 4/1983 | Nagao | 350/96.15 |
| 4,384,760 | 5/1983 | Alferness | 350/96.14 |
| 4,386,822 | 6/1983 | Bergh | 350/96.15 |
| 4,400,056 | 8/1983 | Cielo | 350/96.30 |
| 4,407,561 | 10/1983 | Wysocki | 350/96.30 |
| 4,415,230 | 11/1983 | Keck | 350/96.30 |
| 4,482,202 | 11/1984 | Nagao | 350/96.15 |
| 4,483,617 | 11/1984 | Matsumura et al. | 350/96.30 |

FOREIGN PATENT DOCUMENTS 2533714  3/1984  France .............................. 350/96.14

OTHER PUBLICATIONS

Heismann et al., IEEE Journal of Quantum Electronics, vol. QE-18, No. 4, Apr. 1982, "Integrated-Optical Single-Sideband Modulator and Phase Shifter", pp. 767-771.
Kingston et al., Applied Physics Letters, 42(9), 1 May 1983, "Broadband Guided-Wave Optical Frequency Translator Using an Electro-Optical Bragg Array", pp. 759-761.
S. E. Harris and R. W. Wallace, Acousto-Optice Tunable Filter, *Journal of the Optical Society of America*, vol. 59, No. 6, Jun. 1969.
C. F. Buhrer et al., Optical Frequency Shifting by Electro-Optic Effect, *Applied Physics Letters*, vol. 1, No. 2, Oct. 1962.
James P. Campbell et al., Rotating-Waveplate Optical-Frequency Shifting in Lithium Niobate, *IEEE Journal of Quantum Electronics*, vol. QE-7, No. 9, Sep. 1971.
Ohmachi et al., LiNbO$_3$ TE-TM Mode Converter Using Collinear Acoustooptic Interaction, *IEEE Journal of Quantum Electronics*, vol. QE-13, Feb. 1977.
Willson et al., Magnetostrictive Fiber-Optic Sensor System for Detecting dc Magnetic Fields, Optics Letters, vol. 8, No. 6, Jun. 1983.
Trowbridge et al., Metallic-Glass Fiber-Optic Phase Modulator, Optics Letters, vol. 6, No. 12, Dec. 1981.
W. P. Risk et al., Single-Sideband Frequency Shifting in Birefringent Optical Fiber, SPIE vol. 478, Fiber Optic and Laser Sensors II (1984).

*Primary Examiner*—John Lee
*Assistant Examiner*—Frank González
*Attorney, Agent, or Firm*—John H. Lynn

[57] ABSTRACT

This invention relates to fiber optic frequency shifters for producing optical signals of a desired frequency range for input to a device such as an optical rotation sensing system. The rotating birefringence is created in a length of fiber optic material, which has the effect of a rotating half-wave plate upon an input optical signal. The length of fiber optic material may have a jacket of either an electrostrictive or a magnetostrictive material formed thereon such that application of an appropriate field to the jacket compresses the enclosed fiber to induce birefringence therein by means of the photoelastic effect. A half-coupler having a block of electro-optically active birefringent material adjacent the interaction region combined with an electrode configuration and circuitry for producing a rotatiing electric field in the block also produces a rotating half-wave plate frequency shifter. The evanescent field of light propagating in the optical fiber interacts with the rotating birefringence and experiences a frequency shift. The invention also includes feedback circuitry for processing the optical output of fiber optic rotating half-wave plates to maintain the intensity of components in the output signal having the carrier frequency below a threshold value.

33 Claims, 14 Drawing Figures

FIBER OPTIC FREQUENCY SHIFTER

BACKGROUND OF THE INVENTION

This invention relates generally to frequency shifters and particularly to fiber optic frequency shifters. Still more particularly, this invention relates to a fiber optic frequency shifter for use in an optical rotation sensing system to shift the frequency of light input to a frequency suitable for the angular rotation rate to be detected.

A fiber optic ring interferometer typically comprises a loop of fiber optic material having counter-propagating light waves therein. After traversing the loop, the counter-propagating waves are combined so that they constructively or destructively interfere to form an optical output signal. The intensity of the optical output signal varies as a function of the type and amount of interference, which is dependent upon the relative phase of the counter-propagating waves.

Fiber optic ring interferometers have proven to be particularly useful for rotation sensing. Rotation of the loop creates a relative phase difference between the counter-propagating waves, in accordance with the well known "Sagnac" effect, with the amount of phase difference being a function of the angular velocity of the loop. The optical output signal produced by the interference of the counter-propagating waves varies in intensity as a function of the rotation rate of the loop. Rotation sensing is accomplished by detecting the optical output signal and processing the optical output signal to determine the rotation rate.

In order to be suitable for inertial navigation applications, a rotation sensor must have a very wide dynamic range. The rotation sensor must be capable of detecting rotation rates as low as 0.01 degrees per hour and as high as 1,000 degrees per second. The ratio of the upper limit to be measured and the lower limit is approximately $10^9$.

The output of an open loop fiber optic gyroscope is a sinusoidal waveform. The sinusoid is nonlinear and not single valued, which presents difficulties in obtaining accurate measurements. The amplitude also fluctuates because it is dependent upon several parameters that may fluctuate.

The principle of using a bulk optics rotating half-wave plate as a frequency shifter is well known, and such rotating half-wave plate frequency shifters are used at both microwave and optical frequencies. Optical frequency shifting may be accomplished by passing an optical signal through an electro-optic crystal having a three-fold axis and applying a rotating electric field to the crystal. To be frequency shifted, the optical beam is preferably circularly polarized and directed along the three-fold axis of the crystal. With no field applied, the crystal exhibits no birefringence, and the emergent beam is unaffected. When the applied field has the proper half-wave amplitude and rotates in a plane normal to the three-fold axis, the crystal functions as a rotating half-wave plate. The emergent beam has its optical frequency shifted and its sense of polarity reversed. The frequency shift is equal to the rotation rate of the applied field. Because a uniformly rotating applied field ideally results in a single new frequency in the output beam, rotating field frequency shifters are referred to as single-side-band-suppressed carrier (SSBSC) modulators.

Previous frequency shifters employ nonlinear interactions between acoustic and optical waves and suffer from small band widths, difficult geometries and the requirement for special optical fibers and are unable to provide the accuracy required for airplane navigation.

SUMMARY OF THE INVENTION

This invention provides a fiber optic frequency shifter that is capable of shifting the frequency of input coherent light over the dynamic range required for inertial guidance applications. A fiber optic frequency shifter according to the invention is capable of shifting the frequency either above or below the input frequency without producing undesirable harmonics or sidebands. Further, the amount of frequency shift is continously variable so that the frequency may be swept through a predetermined frequency range under the control of an oscillator. The invention may also include a negative feedback system for maintaining a desired output frequency.

A first embodiment of the frequency shifter comprises a length of fiber optic material having a surrounding coating, or jacket, formed of an interaction material that is preferably an electrostructive or preiselectrically material generally concentric with the fiber. Electrodes are attached to the periphery of the interaction material and electronic circuitry is included for applying electric fields to the electrodes. Application of electric fields to the electrodes creates electric fields in the interaction material, causing the interaction material to contract upon the fiber. Contraction of the interaction material upon the fiber squeezes the fiber and causes stress-induced birefringence. The stress-induced birefringence may be controlled so that the stressed portion of the fiber has the effect of a rotating half-wave plate on an input light wave.

A second embodiment of the invention includes a magnetostrictive material coated upon a length of optical fiber. Application of magnetic fields to the magnetostrictive material causes stress-induced birefringence in the enclosed length of optical fiber. Controlling the magnetic fields with an oscillator causes a rotating stress field around the fiber so that the stressed portion of the fiber functions as a rotating half-wave plate.

A third embodiment of the frequency shifter comprises a plurality of electrodes positioned around a half coupler. The half coupler typically includes a length of optical fiber having a portion of the cladding removed therefrom to form an interaction region. A block of an electro-optically active material is placed adjacent the interaction region, and electrodes positioned around the block of interaction material and the fiber are used to apply electric fields to the fiber and to the block of electro-optically active material to change their indices of refraction. Control of the applied electric fields causes the length of fiber and the adjacent block of electro-optically active material to function as a rotating half-wave plate.

The invention includes a feedback control system responsive to undesired spectral components in the output to adjust the frequency shifter to ensure half-wave operation, which eliminates the input optical frequency from the output beam.

The invention further includes an optical FM encoder to provide a frequency modulated encoded output beam.

DESCRIPTION OF THE PREFERRED EMBODIMENT

Figure 1A:
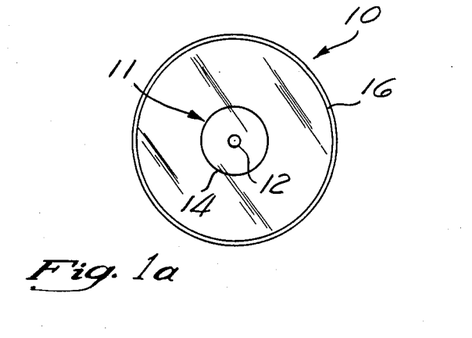
FIG. 1a illustrates an optical fiber being surrounded by an electrostrictive or magnetostrictive material.
Figure 1B:
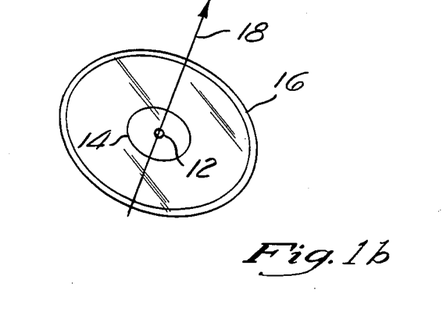
FIG. 1b illustrates the optical fiber of FIG. 1a being deformed upon application of a field to the material surrounding the fiber.

Referring to FIG. 1a, a frequency shifter 10 includes an optical fiber 11 having a core 12 and a cladding 14. The cladding 14 has a coating 16 formed of either a piezoelectric or electrostrictive material or a magnetostrictive material. In the absence of an applied field, the optical fiber 11 and the coating 16 form concentric circles as shown in FIG. 1a. Application of an appropriate field causes the coating 16 to constrict about the optical fiber 11, thereby deforming both the core 12 and the cladding 14 to generally elliptical configurations as shown in FIG. 1b. It is well-known that stressing an optical fiber changes the index of refraction of the fiber and induces birefringence in the fiber by means of the photoelastic effect. The inventor has discovered that proper choice of the length of the optical fiber 11, the thickness of the coating 16 and the magnitude of the applied field will produce a half-wave phase retardation in a circularly polarized light wave input to the optical fiber 11. Rotation of the applied field about the longitudinal axis of the fiber 11 produces the same effect as rotating a bulk wave half-wave plate in an electromagnetic wave of microwave or optical frequencies. If the plate appears to rotate with an angular velocity f then the output frequency is shifted by ±2f, depending upon the direction of rotation of the half-wave plate relative to the direction of the circularly polarized wave. Rotation in the direction of polarization causes the frequency to shift from an input frequency of $f_o$ to an output frequency of $f_o+2f$. Rotation opposite in direction to the polarization reduces the frequency from $f_o$ to $f_o-2f$. In both cases the polarization of the output is reversed relative to the input wave.

Figure 2:
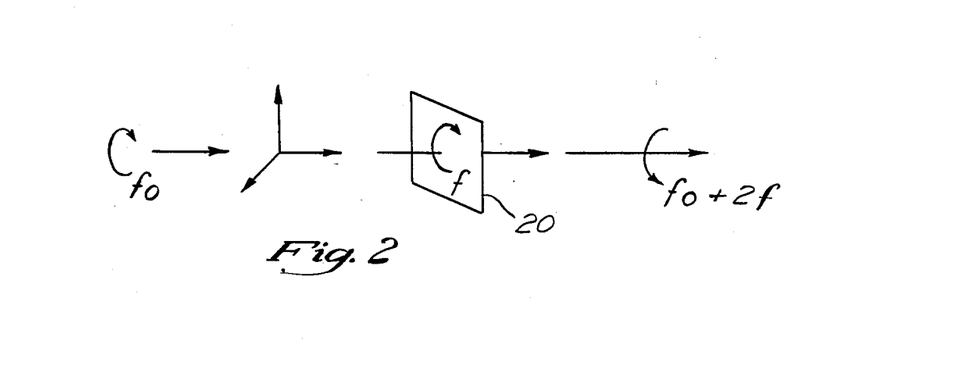
FIG. 2 schematically represents a rotating half-wave plate with light inputs and outputs.

FIG. 2 represents circularly polarized input light being incident upon a half-wave plate 20 that is rotating at an angular velocity f. The input wave is shown to have a frequency $f_o$. The wave is traveling in the positive z-direction and has equal magnitude polarization vectors along the x and y axes which are 90 degrees out of phase. Therefore, the polarization vector appears to rotate at angular velocity $f_o$ about the z axis in a clockwise direction when viewed looking toward the direction of propagation. The half-wave plate 20 rotates in the same direction as the polarization vector so that the output wave is frequency shifted from the input frequency $f_o$ to have a frequency of $f_o+2f$.

Figure 3:
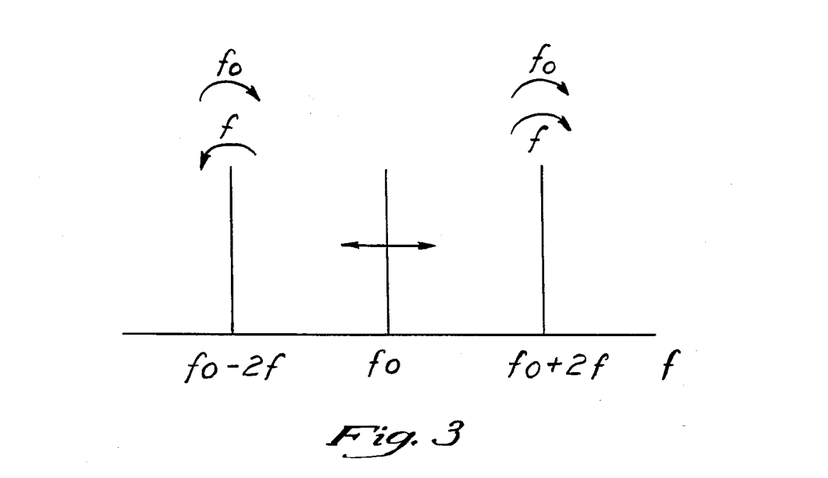
FIG. 3 graphically represents possible inputs and outputs for a rotating half-wave plate.

FIG. 3 graphically represents the possible frequency outputs from the phase shifter 10 when it is operated as a single-side-band-suppressed-carrier phase shifter. If the input frequency is $f_o$, then rotating the half-wave plate at a frequency f in the direction of polarization of the input beam produces an output of $f_o+2f$. Rotating the half-wave plate 20 at the frequency f opposite in direction to the polarization of the circularly polarized input wave produces an output frequency of $f_o-2f$. Controlling the rotational frequency f permits the output frequency of the quarter-wave plate to have a range of $f_o\pm 2f_{max}$, where $f_{max}$ is the maximum rotational frequency of the half-wave plate 20.

Figures 4, 5, 6, 7:
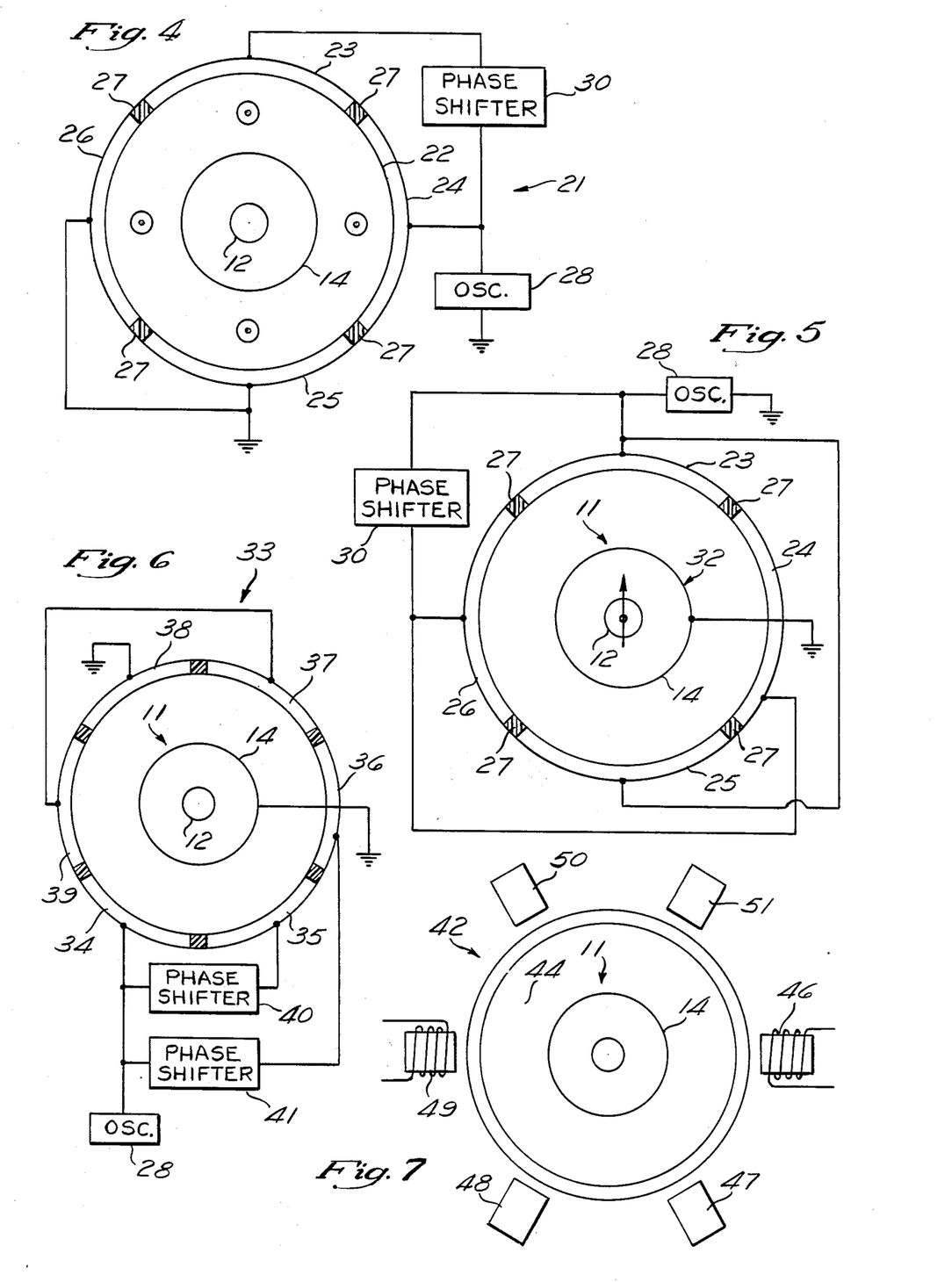
FIG. 4 schematically represents a first embodiment of a frequency shifter including an optical fiber enclosed in an interaction material having electrodes connected to the outer surface thereof.
FIG. 5 schematically represents an alternate electrode configuration for a frequency shifter according to the invention.
FIG. 6 illustrates a second alternate electrode configuration for the frequency shifter.
FIG. 7 illustrates an optical fiber being surrounded by a magnetostrictive material and a plurality of magnets for applying magnetic fields thereto to form a frequency shifter.

FIG. 4 illustrates a fiber optic phase shifter 21 wherein a piezoelectric or electrostrictive material forms a jacket 22 surrounding the cladding 14. Suitable materials for forming the jacket 22 are polyvinylidene fluoride, commonly called $PVF_2$ and zinc oxide ZnO. $PVF_2$ is generally applied from a melt onto the fiber 11. A plurality of electrodes 23-26 separated by insulators 27 are coated onto the jacket 22. A suitable material for forming the electrodes 23-26 is any electrically conductive substance that may be sputtered or painted on the jacket 22. In the embodiment shown in FIG. 4, the layer of $PVF_2$ should be 2-3 times the diameter of the cladding 14 so that applying an electric field to the electrodes 23-26 produces a rotating birefringence in the fiber 11. The electrodes 25 and 26 are grounded, and the electrode 24 receives an electrical signal having a frequency f from an oscillator 28. A phase shifter 30 is connected between the oscillator 28 and the electrode 23. The output of the phase shifter 30 preferably is phase shifted by 90 degrees from the input so that the electrodes 23 and 24 have electrical signals having a phase difference of 90 degrees applied thereto.

If the thickness of the $PVF_2$ jacket 22 is 2-3 times the diameter of the fiber cladding 14, then application of the 90 degree out of phase signals to the electrodes 23 and 24 with the electrodes 25 and 26 being grounded produces two electric field vectors that are 90 degrees out of phase in the $PVF_2$ jacket 22. The resultant electric field rotates at the oscillator frequency f. The electric field vectors cause the $PVF_2$ material to constrict about the fiber 11 to form the generally elliptical configuration shown in FIG. 1b.

The rotating electric field vector acts upon the jacket material 22 and produces a rotating force vector. The rotating force vector produces a rotating stress field in the jacket 22 and in the fiber 11. The rotating stress causes a rotating strain change in the core of the optical fiber 11, which changes the index of refraction in the direction of the strain by means of the photoelastic effect. Therefore, the rotating stress field produces a rotating birefringence in the fiber 11. It is well known that a light wave propagating through a birefringent material undergoes a phase shift that is dependent upon the birefringence.

FIG. 5 illustrates a second fiber optic frequency shifter 31, which is a modification of the frequency shifter 21 of FIG. 4. An electrode 32 is coated around the periphery of the fiber cladding 14 and is grounded. The oscillator 28 is connected directly to the opposing electrodes 23 and 25 and is connected to the electrodes 24 and 26 through the 90 degree phase shifter 30. The advantage of the electrode configuration of FIG. 5 is the provision of higher electric fields in the jacket 22 for the same output of the voltage oscillator 28 and thickness of the jacket 22 than is possible with the embodiment of FIG. 4. The electric field in the jacket 22 depends inversely upon the distance between the grounded and ungrounded electrodes. Having the grounded electrode 32 around the fiber as shown in FIG. 5 causes the distance between grounded and ungrounded electrodes to be less than in the configuration of FIG. 4.

Referring to FIG. 6, it is possible to construct a frequency shifter 33 according to the invention using six substantially identical electrodes 34–39. The central electrode 32 is grounded as shown in FIG. 5. The ungrounded electrodes 34–36 are driven by an oscillator, such as the oscillator 28, with adjacent electrodes being driven by signals that are 120 degrees out of phase with one another. A 120 degree phase shifter 40 connected between the oscillator 28 and the electrode 35, and a −120 degree phase shifter 41 connected between the oscillator 28 and the electrode 36 provide the desired phase difference. The electrode configuration of FIG. 6 permits the use of a thinner layer for the jacket 22 than is possible with the embodiment of FIG. 5. The electrodes 23–26 and 32 of the embodiment shown in FIG. 5 apply diametrically opposed squeezes to the fiber, and the result may be viewed merely as two perpendicular fiber squeezes, but no rotating birefringence if the material of the jacket 22 is less than 2–3 times the diameter of the fiber cladding 14. The electrode configuration of FIG. 6 does not apply two perpendicular squeezes to the fiber; therefore, driving the electrodes 34 directly by the oscillator 28 and the electrodes 35 and 36 through the 120 degree phase shifter and the −120 phase shifter, respectively, readily produces a rotating field and a rotating birefringence in the jacket 22 and the fiber core 14.

By properly controlling the voltage of the output oscillator 28 and properly choosing the thickness and length of the jacket 22, it is possible to control the birefringence of the length of the fiber 11 so that it appears to be a rotating half-wave plate to an input light wave. The length of the jacket 22 is determined in part by the electromagnetic properties of the fiber 11 and the material comprising the jacket 22. Other considerations in determining the length of the jacket 22 are the peak electromagnetic fields applied to the jacket 22 and the dielectric breakdown strength of the jacket 22. The birefringence of the fiber is also a factor that must be considered in determining the dimensions of the jacket 22. The ideal case is to have the length of the fiber 11 enclosed in the jacket 22 appear to be half a wavelength at peak applied field.

FIG. 7 illustrates a frequency shifter 42 according to the invention employing a magnetostrictive material to form a jacket 44 around the fiber cladding 14. The magnetostrictive jacket 44 may be formed of amorphous $Fe_{80}B_{20}$ alloy, which is a metallic glass having a relatively high magnetostrictive extension coefficient. The metallic glass material may be readily sputter coated onto the cladding 14. It may be possible to form the jacket 44 of a sputtered film of nickel, which is polycrystalline, having a great number of grain boundaries. The advantage of the amorphous metallic glass over ploycrystalline material is that it has rather soft magnetic properties, which enable it to reach magnetic saturation in an applied field smaller than that necessary to achieve the same effect in a crystalline material. A plurality of electromagnets 46–51 are arranged in a generally equally angular spaced orientation around the fiber 11. Applying properly sequenced signals to the electomagnets 46–51 causes a rotating deformation of the magnetostrictive jacket 44, which in turn produces a rotating strain in the fiber core 12. Therefore, the electromagnets 46–51, the magnetostrictive jacket 44 and the optical fiber 11 cooperate to present a rotating half-wave plate to a light wave input to the fiber 11.

Electrostrictive and magnetostrictive materials do not need to have highly ordered structures in order to stress the fiber 11 in the presence of an applied field. Therefore, the jackets 22 and 44 may be advantageously applied by sputtering. After application to the fiber 57, the jackets 22 and 44 must be poled to have a desired alignment of internal fields. The material is heated above the Curie temperature and an appropriate external field is applied to align the molecular fields. The material is slowly cooled under the influence of the applied field. Properly aligning the molecular fields ensures that the subsequently applied fields stress the fiber 11 to deform it as shown in FIG. 1b.

Figure 8:
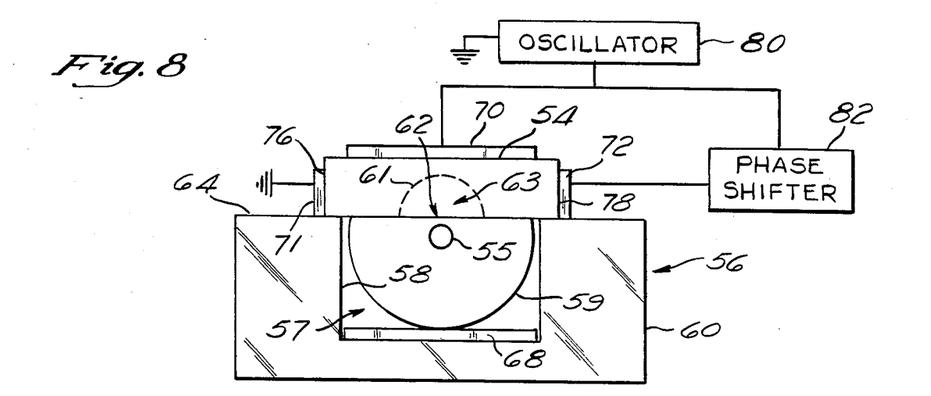
FIG. 8 represents a cross-section of a half-coupler in combination with a block of electro-optically active material and a plurality of electrodes to form a frequency shifter.
Figure 9:
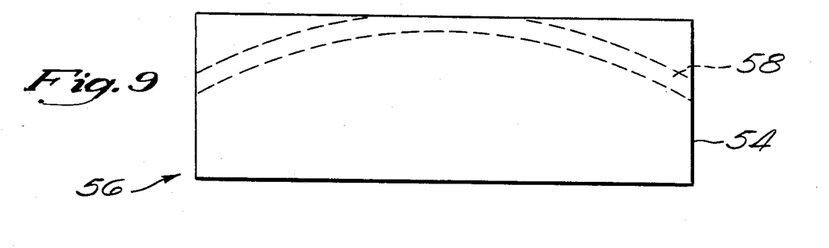
FIG. 9 is a side elevation view of the half-coupler of FIG. 8 showing the groove in which the fiber is mounted.

Referring to FIG. 8, a fiber optic frequency shifter 52 includes a block 54 of electro-optically active birefringent material placed adjacent a half-coupler 56. The half-coupler 56 comprises a length of fiber optic material 57 including a core 55 and a cladding 59 disposed within a slot 58 in a substrate 60, which is preferably a quartz block. A portion of the cladding 59 has been removed from the fiber 57 at the outer edge of the groove 58 to form an interaction region 62. The groove 58 is preferably convexly curved as shown in FIG. 9. The groove 58 may have a rectangular cross-section as shown in FIG. 8, or the groove 58 may have a bottom surface 66 that is curved shown in FIG. 10. Formation of the half-coupler 56 ordinarily involves first forming the groove 58 in the substrate 60, fixing the fiber 57 within the groove 58 and then grinding and polishing down the surface 64 of the substrate 60 until the desired amount of cladding 59 has been removed. The interaction region 62 includes an elongated planar surface on the core 59 similar to an ellipse. The thickness of the cladding 59 is minimum at the center of the interaction region 62 and increases in thickness as distance measured along the length of the fiber 57 increases away from the center of the interaction region 62.

Only a relatively small portion 63 of the block 54 in which the evanescent field of light propagating in the fiber penetrates affects the birefringence of the optical fiber 57. As shown by the dotted line 61, the region of concern is an arc having a radius of about 10 microns centered on the core 55. Only the phase characteristics of the input optical wave are important in the interaction of the light in the fiber 57 with the block 54.

The block 54 may be formed of an electro-optically active birefringent material, such as lithium niobate. Preferably, the block 54 is formed of materials such as sodium nitrite or potassium dithionate, which have refractive indices similar to that of the fiber 57. When a birefringent material is placed in the evanescent field of light propagating in a nonbirefringent fiber, the composite structure becomes birefringent. The principal axis of the birefringent material determines the principal axis of the composite structure. If the fiber 57 is a single mode optical fiber, it will guide only modes in which the electric and magnetic vectors are mainly transverse to the direction of propagation of light through the fiber 57. Therefore, the fields in the fiber 57 are directed across the fiber core 55 and have evanescent fields in the cladding 59. The evanescent wave may be regarded as being formed of two components that are orthogonal to one another and to the principal axis of the block 54 of birefringent electro-optic material.

Figure 10:
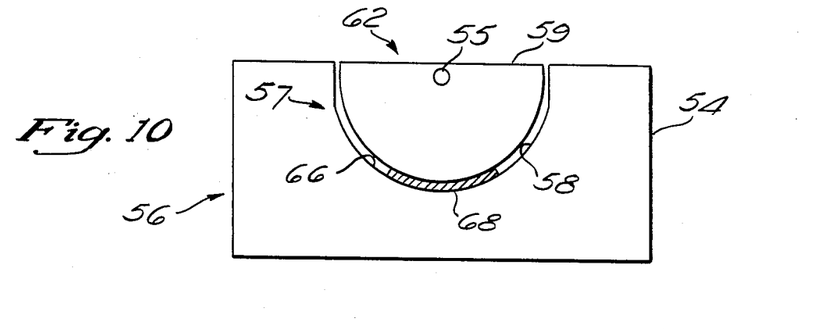
FIG. 10 is a cross-sectional view of the half-coupler of FIG. 9 illustrating groove having a curved lower surface.
Figure 11:
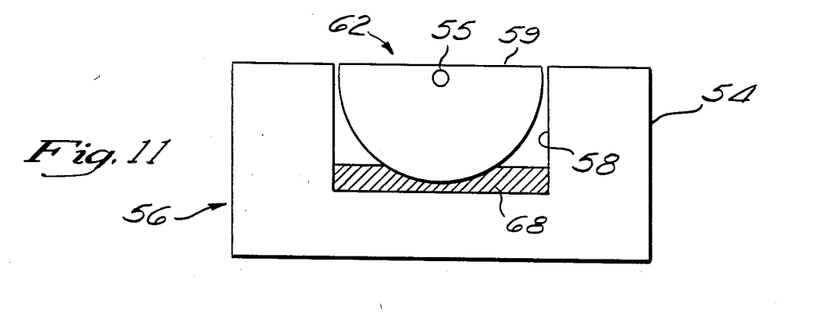
FIG. 11 is a cross-sectional view of the half-coupler of FIG. 8 illustrating an alternative electrode configuration.

Referring again to FIG. 8, an electrode 68 is positioned in the bottom of the groove 58 in contact with the cladding 59. The electrode 68 may be flat as shown in FIG. 8, or it may conform to the curved shaped of the core 14 as shown in FIGS. 10 and 11.

The block 54 of electro-optically active material has a plurality of electrodes 70–72 attached thereto. The electrode 70 is placed above the block 54 as shown in FIG. 8 in generally parallel alignment with the interaction region 62. The electrodes 71 and 72 are mounted to end faces 76 and 78, respectively, of the block 54.

As shown in FIG. 8, the electrodes 71 and 68 are grounded. The output of an oscillator 80 is connected directly to the electrode 70 and to a phase shifter 82. The phase shifter 82 preferably produces an output that is phase shifted by 90 degrees from the input. The output of the phase shifter 82 is connected to the electrode 72 so that the electrodes 70 and 72 are driven by voltages that are 90 degrees out of phase.

If the birefringent material 54 and the length of the interaction region 62 are correctly choosen, then application of voltage from the oscillator 80 directly to the electrode 70 and to the electrode 72 through the phase shifter 82 with the electrodes 71 and 68 being grounded, then a rotating half-wave plate can, in effect, be formed in the fiber 57. Application of the 90 degree out-of-phase voltages to the electrodes 70 and 72 forms rotating electric fields which causes the electro-optically active birefringent material 54 to result in a rotating birefringence therein. Since the birefringence of the block 54 determines the birefringence of the frequency shifter 52, light propagating in the fiber 57 encounters a rotating birefringence when traveling through the portion of the core 55 adjacent the interaction region 62. Circularly polarized light propagating through the interaction region 62 undergoes a frequency shift as described above.

If perturbations exist in the rotating birefringence or in the state of polarization of the input light, then harmonics are generated during the phase shifting operation.

It is possible to form an evanescent field phase shifter without having the fiber 57 mounted in the substrate 60. The desired portion of the cladding 59 may be ground away to form the interaction region 62. The electrode 68 may be adhered directly to the fiber 57, and the electrodes 70–72 adhered to the birefringent block 54.

The interaction region 62 must appear to have a length equal to an odd integral number of half wavelengths in order to produce an output wave having frequency $f_o \pm 2f$, where f is the oscillator frequency. If the length of the interaction region 62 is not an odd integral number of half wavelengths, then a portion of the carrier frequency $f_o$ is transmitted through the frequency shifter 52.

The amplitude of the outputs of the frequency shifters 21, 31, 33, 42, and 56, respectively of FIGS. 4–8, are given by $$\phi(t) = A e^{j(f_o + 2f)t} + B e^{j f_o t} \tag{1}$$

The intensity of the output wave is the square of the amplitude and is given by $$I = |\phi(t)|^2 \tag{2}$$

$$= A^2 + B^2 + 2AB \cos(2ft) \tag{3}$$

Figure 12:
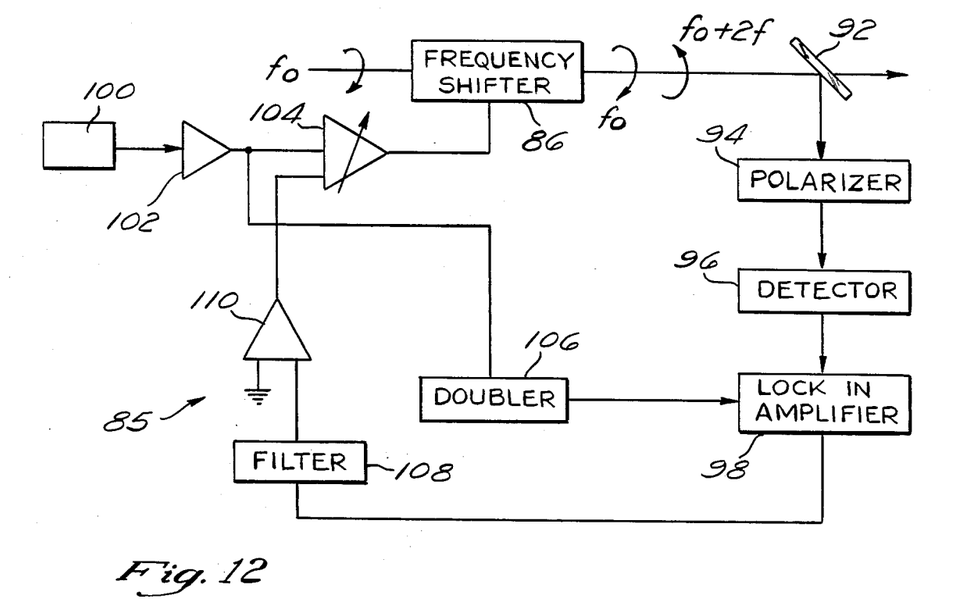
FIG. 12 is a block diagram of a feedback system for controlling the frequency output of the frequency shifters illustrated in FIGS. 4-8.

The coefficient A is ordinarily much larger than B so that $B^2$ is negligible. FIG. 12 illustrates a feedback system control 85 for controlling the output frequency of a frequency shifter 86 to minimize the underdesired carrier frequency component. The frequency shifter 86 may be any of the frequency shifters 21, 31, 33, 42, and 52 shown in FIGS. 4–8.

The frequency shifter 86 has incident thereon a light wave of frequency of $f_o$ from a light source 90. The incident wave has a clockwise circular polarization as seen looking from the light source 90 toward the frequency shifter 86. The amplitude output from the frequency shifter 86 is given by Equation (1). The term $B e^{j f_o t}$ represents an undesired portion of the carrier input signal that has propagated through the frequency shifter 86. The output beam of the frequency shifter 86 is incident upon a beam splitter 92, which may, for example, transmit approximately 90% of the incident light straight through while reflecting approximately 10% of the incident light upon a polarizer 94.

The unwanted portion of the output intensity has the same polarization as the input wave while the desired portion of the output intensity has the opposite polarization. The polarizer 94 transmits only a portion of each wave. The output of the polarizer 94 is incident upon a photodetector 96, which outputs an error signal indicative of the third term of Equation (3).

The error signal is input to a lock-in amplifier 98. A voltage source 100 supplies a voltage V to a voltage-controlled-oscillator 102, which produces an oscillatory voltage having a frequency f that is a function of V. The output of the voltage-controlled-oscillator 102 is amplified by a variable gain amplifier 104 to provide a control signal to the frequency shifter 86 and to a doubler 106. The doubler 106 provides an output signal having a frequency of 2f to the lock-in amplifier 98, thereby causing the lock-in amplifier 98 to amplify only signals having frequency 2f, which is the frequency of the third term of Equation (3). The output of the lock-in amplifier 98 is a voltage proportional to 2AB, the coefficients of the third term, 2AB cos(2ft) of Equation (3). The output of the lock-in amplifier 98 passes through a filter 108 to a comparator 110 that has one grounded input. Therefore, if the voltage proportional to 2AB that is input to the comparator 110 is not zero, then the comparator 110 produces an output voltage that is input to the gain control of the variable gain amplifer 104 as a negative feedback signal to either increase or decrease the voltage of the control signal input to the frequency shifter 86. The negative feedback signal causes a reduction in the coefficient B, which reduces the error signal and causes the output of the frequency shifter 86 to have the desired frequency.

Figure 13:
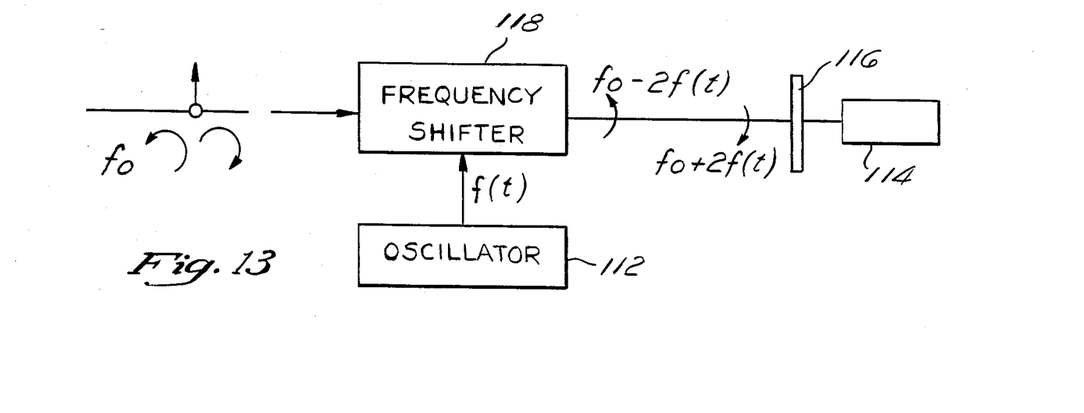
FIG. 13 is a block diagram of an optical frequency modulator including a frequency shifter according to FIGS. 4-8.

The fiber optic frequency shifters described herein may be used to form an FM encoder as shown in FIG. 13. Signals of both circular polarizations are input in equal magnitudes to a frequency shifter 118. A modulating signal having a time-varying control frequency f(t) is input from an oscillator 112 to the frequency shifter 110 to control the rotation rate. The output signal is an FM encoded signal having intensity $$I = 2A|e^{i(f()t - 2f(t)t)} + e^{i(f()t + 2f(t)t)}|^2 \quad (4)$$

$$= 2A(1 + \cos 4f(t)t) \quad (5)$$

The modulated signal may be detected by an analyzer 116, which may be a linear polarizer of arbitrary polarization, and a detector 114 and demodulated by mixing it with appropriate demodulating signal having a time dependence of 4f(t)t.

What is claimed is:

1. A fiber optic frequency shifter, comprising:
   a length of optical fiber for propagating a light wave therein; and
   means for inducing a rotating birefringence in said length of optical fiber, said length of optical fiber and the rotating birefringence cooperating to form a rotating half-wave plate which shifts the frequency of the light wave input to the optical fiber by ±2f, where f is the angular frequency of the rotating birefringence.

2. The fiber optic frequency shifter of claim 1 wherein said inducing means comprises:
   a piezoelectric or electrostrictive material forming a jacket around said length of optical fiber; and
   means for forming a rotating electric field in said jacket to deform said jacket and said length of optical fiber, thereby causing stress-induced birefringence therein.

3. The fiber optic frequency shifter of claim 2 wherein said optical fiber has a core and a cladding of predetermined thicknesses and the jacket has a thickness in the range of 2 to 3 time the cladding thickness.

4. The fiber optic frequency shifter of claim 2 wherein said forming means comprises:
   a plurality of electrodes formed around said jacket; and
   means for applying voltages having predetermined phase relationships to said electrodes.

5. The fiber optic frequency shifter of claim 4 wherein said applying means comprises:
   an oscillator for producing an output voltage having a frequency f; and
   a ninety degree phase shifter connected to said oscillator, the outputs of said oscillator and said ninety degree phase shifter being applied to adjacent electrodes.

6. The fiber optic frequency shifter of claim 5 wherein there are four electrodes formed around said jacket, the first one of said electrodes being connected directly to said oscillator, a second one of said electrodes being connected to the output of said ninety degree phase shifter, the remaining two of said electrodes being grounded.

7. The fiber optic frequency shifter of claim 6 wherein the fiber has a cladding of predetermined thickness and said four electrodes are spaced apart by equal arc lengths around a circumference of the optical fiber and said jacket has a thickness in the range of 2 to 3 times the cladding thickness.

8. The fiber optic frequency shifter of claim 6 wherein the four electrodes are equally spaced around a circumference of the fiber.

9. The fiber optic frequency shifter of claim 4, further comprising a grounded electrode formed around said length of optical fiber so that said jacket is between said plurality of electrodes and said grounded electrode.

10. The fiber optic frequency shifter of claim 9 wherein said optical fiber has a core and a surrounding cladding of predetermined thicknesses and said jacket has a thickness in the range of 2 to 3 times the cladding thickness.

11. The fiber optic frequency shifter of claim 9 further comprising:
    an oscillator for producing an output voltage having a frequency f; and
    a ninety degree phase shifter connected to said oscillator, the outputs of said oscillator and said ninety degree phase shifter being applied to alternate electrodes.

12. The fiber optic frequency shifter of claim 4 further comprising:
    six electrodes formed around said jacket; and
    means for applying 120 degree out of phase voltages to three successive electrodes to form a rotating electric field in said jacket, said jacket being responsive to said rotating electric field to produce a rotating stress induced birefringence in said length of optical fiber.

13. The fiber optic frequency shifter of claim 12 wherein said six electrodes are equally spaced apart around a circumference of said optical fiber.

14. The fiber optic frequency shifter of claim 13 wherein the optical fiber has a core and a cladding of predetermined thickness and said jacket has a thickness in the range of 2 to 3 cladding thicknesses.

15. The fiber optic frequency shifter of claim 1 wherein said inducing means comprises:
    a magnetostrictive material forming a jacket around said length of optical fiber;
    a plurality of angularly spaced electromagnets arranged around said magnetostrictive jacket; and
    means for successively applying electric current to said electromagnets to produce a rotating compressive force in said magnetostrictive jacket to create a rotating stress induced birefringence in said length of optical fiber.

16. The fiber optic frequency shifter of claim 15 wherein said optical fiber has a core and a cladding of predetermined thicknesses and said jacket has a thickness in the range of 2 to 3 times the cladding thickness.

17. The fiber optic frequency shifter of claim 16 wherein the plurality of electromagnets are spaced apart at equal intervals around a circumference of said length of optical fiber.

18. A fiber optic frequency shifter comprising:
    a length of optical fiber having a core and a cladding, a portion of the cladding having been removed from said length of optical fiber to form an interaction region;

a block of birefringent material adjacent said interaction region so that a light wave propagating in said length of optical fiber has an evanescent field penetrating into said block; and means for controlling the birefringence of said block to form a rotating birefringence in said length of optical fiber to cause the length of optical fiber to act as a rotating half-wave plate upon light propagating therein.

19. The fiber optic frequency shifter of claim 18 wherein the block of birefringent material is an electro-optically active material.

20. The fiber optic frequency shifter of claim 19 wherein said controlling means comprises:

a plurality of electrodes arranged to apply electric fields to said block;

oscillator means for driving at least one of said plurality of electrodes with a voltage of frequency f; and means for driving at least one other of said plurality of electrodes with a voltage of frequency f that is phase shifted by 90 degrees from the voltage applied to said first electrode, said electrodes and said applied voltages cooperating to form a rotating electric field in said block to create a rotating birefringence therein, the evanescent field of a light wave propagating in said length of optical fiber interacting with the rotating half-wave birefringence to experience a frequency shift of ±2f as the light wave travels through said length of optical fiber.

21. A fiber optic frequency shifter for shifting an optical input signal having a frequency $f_o$ to produce an optical output signal having frequency $f_o \pm 2f$, where f is the amount of frequency shift, comprising:

a length of optical fiber;

means for forming a rotating half-wave plate in said length of optical fiber;

means for controlling the rotation rate of said half-wave plate to control the difference between the frequency input to said half-wave plate and the frequency of the signal output from said half-wave plate; and feedback means for processing the output signal of said half-wave plate to maintain the intensity of components in the output signal having the frequency $f_o$ below a predetermined threshold value.

22. The frequency shifter of claim 21 wherein said controlling means includes:

a voltage source for producing a frequency control voltage; and a voltage controlled oscillator connected to the voltage source to receive the frequency control voltage therefrom, said voltage controlled oscillator producing a control signal of frequency f for input to the rotating half-wave plate.

23. The frequency shifter of claim 22 wherein said feedback means comprises:

beam splitter positioned so that the output signal of said half-wave plate is incident thereon, said beam splitter reflecting a first portion of the light incident thereon and transmitting a second portion thereof;

polarizing means for transmitting light of each polarization in said reflected beam;

detector means for producing an error signal in response to the light of an undesired polarization transmitted by said polarizing means; and means for comparing the error signal with a reference for producing a feedback signal for adjusting the gain of said variable gain amplifier.

24. The frequency shifter according to claim 23 further comprising:

a lock-in amplifer connected to receive the output of said detector;

a frequency doubler connected to said lock-in amplifer to provide a signal having frequency equal to twice the control signal frequency to said lock-in amplifer so that said lock-in amplifer produces an output signal responsive only to signals from said detector of the frequency 2f; and a comparator connected between the lock-in amplifer and the gain control of the variable gain amplifier, said comparator producing a feedback signal for adjusting the gain of said gain control amplifer if the error signal exceeds a threshold value.

25. A method for shifting an optical signal of a frequency $f_o$ to an output optical frequency $f_o \pm 2f$, comprising the steps of:

introducing an optical signal having the optical frequency $f_o$ into a selected length of optical fiber; and inducing a birefringence rotating at the frequency f in the length of optical fiber to form a rotating half-wave plate in the optical fiber.

26. The method of claim 25 further comprising the steps of:

forming a piezoelectric jacket around the length of optical fiber, thereby creating a stress-induced birefringence therein.

27. The method of claim 26 further comprising the steps of:

placing a plurality of electrodes around the jacket, and applying voltages having predetermined phase relationships to selected electrodes.

28. The method of claim 27 further comprising the step of forming a grounded electrode on the fiber before forming the jacket around the fiber.

29. A method for shifting an input optical signal of a frequency $f_o$ to an output optical frequency $f_o \pm 2f$, comprising the steps of:

removing a portion of the cladding from a length of optical fiber to form an interaction region;

placing a block of birefringent material adjacent the interaction region so that a light wave propagating in the length of optical fiber has an evanescent field extending into said block; and controlling the birefringence of the block to a rotating birefringence in the length of optical fiber to cause the length of optical fiber to act as a rotating half-wave plate upon light propagating therein.

30. The method of claim 29 wherein said controlling step comprises the steps of:

arranging a plurality of electrodes to apply electric fields to the block;

driving at least one of the plurality of electrodes with a voltage of frequency f; and driving at least one other of the plurality of electrodes with a voltage of frequency f that is phase shifted by 90 degrees from the voltage applied to the first electrodes to cause a rotating electric field in the block to create a rotating birefringence therein, the evanescent field of a light wave propagating in the length of optical fiber interacting with the rotating birefringence to experience a frequency shift of 2f.

31. A method of shifting an input optical frequency of a frequency $f_o$ to an output optical frequency $f_o \pm 2f$, comprising the steps of:

selecting a length of optical fiber;

forming a rotating half-wave plate in the length of optical fiber;

controlling the rotation rate of the half-wave plate to control the amount of the frequency shift; and processing the output signal of the half-wave plate to maintain the intensity of components in the optical output signal having the frequency $f_o$ below a predetermined threshold value.

32. The method of claim 31 wherein the controlling step comprises the steps of:

producing a frequency control voltage;

applying the frequency control voltage to a voltage-controlled oscillator to produce a control signal of frequency f; and applying the control signal to the half-wave plate to control the rotation rate thereof.

33. The method of claim 32 wherein the processing step includes the steps of:

splitting the optical output of the half-wave plate into first and second portions;

polarizing the first portion;

detecting the output of the polarizer to produce an error signal; and comparing the error signal with a reference for producing a feedback signal for adjusting the gain of a variable gain amplifier to adjust the half-wave plate to reduce the intensity of components in the optical output signal having the polarization and frequency of the optical input signal.

* * * * *